United States Patent [19]

Bürcky et al.

[11] Patent Number: 5,075,148

[45] Date of Patent: Dec. 24, 1991

[54] GARDEN BENCH BOARD MADE OF PLASTIC MATERIAL, PARTICULARLY OF RECYCLABLE PLASTIC MATERIAL

[75] Inventors: Walter Bürcky, Bolanden; Theo Rydmann, Hettenleidelheim, both of Fed. Rep. of Germany

[73] Assignee: Dr. Spiess Kunstoff-Recycling GmbH & Co., Kleinkaribach/P Falz, Fed. Rep. of Germany

[21] Appl. No.: 505,901

[22] Filed: Apr. 6, 1990

[51] Int. Cl.[5] ............................ B32B 1/04; B32B 3/02
[52] U.S. Cl. .......................................... 428/76; 47/18; 297/452; 108/28; 108/29; 108/42; 108/43; 428/36.91; 428/192
[58] Field of Search ............... 428/76, 36.91, 358, 428/192; 108/28, 29, 42, 43; 47/18; 297/452, DIG. 2

[56] References Cited

U.S. PATENT DOCUMENTS

| 3,771,828 | 11/1973 | Schwitters | 297/452 |
| 3,900,649 | 8/1975 | Hart | 428/76 |
| 3,941,087 | 2/1976 | Yazaki | 118/306 |
| 4,839,204 | 6/1989 | Yoshino | 428/35.8 |
| 4,924,623 | 5/1990 | van Rens | 47/18 |

Primary Examiner—Ellis P. Robinson
Assistant Examiner—Rena L. Dye
Attorney, Agent, or Firm—Barnes & Thornburg

[57] ABSTRACT

A garden bench board made of a plastic material, particularly of recyclable plastic material, having a reinforcement which is embedded into the plastic material to prevent bending, includes one deformable zone respectively provided preferably at the longitudinal-side ends of the reinforcement so that a warping of the garden bench board or a tearing-apart of the sheathing is reliably avoided.

6 Claims, 1 Drawing Sheet

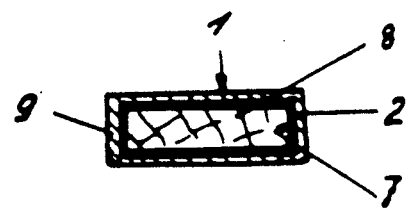
Fig. 2
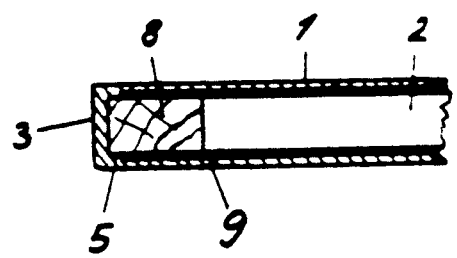
Fig. 3
Fig. 1

GARDEN BENCH BOARD MADE OF PLASTIC MATERIAL, PARTICULARLY OF RECYCLABLE PLASTIC MATERIAL

BACKGROUND AND SUMMARY OF THE INVENTION

The present invention generally relates to a garden bench board made of a plastic material and having a reinforcement which is surrounded on all sides by a sheathing, and more particularly to a garden bench board arrangement wherein a warping of the garden bench board or a tearing-apart of the sheathing are reliably avoided.

Garden bench boards made of plastic material have been disclosed which have a rectangular-tube reinforcement. These garden bench boards are open at the ends and are subsequently closed off by one separate plastic cap respectively.

In the case of garden bench boards made of a recyclable plastic material, however, this method cannot be used because the ends of the garden bench boards are not sharp-edged. A possible reworking also does not achieve a clean transition between the garden bench board and the closing cap. There is also the risk that a rusting of the reinforcement caused by the trickling-in of moisture cannot be avoided.

In order to Prevent this rusting, the garden bench boards are usually taken down and stored during the cold season. They will then be remounted in the spring. This work requires a lot of time and is expensive. In addition, the closing caps may easily fall off and be lost.

Attempts to close off the ends of the garden bench boards in one operation as early on in the manufacturing process as during the sheathing of the reinforcement have not been successful because, when the sheathing is cooled, tension may occur as a result of the shrinking process which warps the garden bench board in a circular manner or simply causes the plastic sheathing to tear apart in the center of the garden bench board. This tearing-apart, as a rule, would not occur before the garden bench boards had been mounted and had been subjected to atmospheric exposure for some time.

Thus, it is an object of the present invention to provide a garden bench board, made of a plastic material, and having a reinforcement which is surrounded on all sides by a sheathing and wherein a warping of the garden bench board or a tearing-apart of the sheathing is reliably avoided.

This object and other objects, according to one embodiment of the present invention, are achieved by providing one deformable zone respectively at longitudinal-side ends of the reinforcement which is embedded into the plastic material.

As a result of the deformable zones provided at both sides of the garden bench board, the shrinking process of the plastic sheathing is not disturbed by the rigid reinforcement so that it can take place as if it were carried out under normal conditions. The flexible deformable zones, which function as an elastic intermediate member between the rigid reinforcement and the sheathing of plastic material, which shrinks during the cooling, reliably prevent any shrinking tensions in the garden bench board. Thus, the garden bench boards do not alter their given shape.

In a further embodiment of the present invention, the reinforcement may consist of a tube. Preferably, a rectangular tube is provided in this case which, with respect to the outer contours, corresponds to conventional garden bench boards. This arrangement is particularly advantageous in that rectangular tubes have a high section modulus with low expenditures with respect to material.

In addition, the deformable zone may comprise a block of material which does not melt at the melting temperature of the plastic and which is arranged between the ends of the reinforcement and the closing-off plastic wall at the ends of the garden bench board.

Furthermore, the block of material may be insertable into ends of the reinforcing tube and embedded in the plastic sheathing. As a result, an elastic intermediate member is created between the shrinking sheathing and the rigid reinforcement, in that the block of material, which is rigid per se, during the shrinking process, can penetrate into the reinforcing tube so that this shrinking process can take place unhindered and shrinkage tensions do not occur between the rigid reinforcement and the considerably shrinking sheathing.

Moreover, the block of material may consist of wood. This makes the manufacturing of the intermediate member inexpensive and simple.

Other objects, advantages and novel features of the present invention will become apparent from the following detailed description of the invention when considered in conjunction with the accompanying drawings.

BRIEF DESCRIPTION OF THE DRAWINGS

FIG. 1 is a longitudinal sectional view of a garden bench board according to one embodiment of the invention;

FIG. 2 is a cross-sectional view of a garden bench board of FIG. 1; and

FIG. 3 is an enlarged partial sectional view of a garden bench board in longitudinal direction.

DETAILED DESCRIPTION OF THE DRAWINGS

The invention will be explained in detail with respect to an embodiment shown in the drawings.

A garden bench board 1 is shown in the figures equipped with a reinforcement 2 which consists of, for example, a rectangular tube 7. At longitudinal-side ends 3, 4 of the reinforcement 2, blocks 8 of material are inserted which serve as deformable zones 5, 6. The closing-off plastic sheathing 9, arranged at the ends of the garden bench board 1, encloses the blocks 8 of material and the reinforcement 2 on all sides so that no moisture can destroy the reinforcement 2 as a result of rusting.

During the cooling of a just-manufactured garden bench board 1, the shrinking process between the rigid reinforcement 2 and the considerably shrinking sheathing 9 can take place without interference because the plastic sheathing, which shrinks more, can progressively push the blocks 8 of material into the longitudinal-side ends 3, 4 of the reinforcement 2 to a degree at which the shrinking process progresses. The tension differences occurring in the cross-section are negligibly small and present no problem. As a result of the deformable zones 5, 6, the warping of manufactured garden bench boards 1 is not only avoided, but a tearing-apart of the plastic sheathing 9 is also reliably avoided.

For reasons of simplicity, the blocks 8 of material forming the deformable zones 5, 6 may consist, for example, of wood. Naturally, any other suitable material may also be used for this purpose without exceeding the scope of the invention. The garden bench boards 1, which are manufactured with a deformable zone 5, 6, do not have to be repressed in order to correct a possible warping.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A garden bench board comprising:
   a plastic sheathing and
   a rigid reinforcement surrounded by the plastic sheathing, deformable means being provided at longitudinal-side ends of the reinforcement and also surrounded by the plastic sheathing to move relative to the reinforcement to compensate for differential contraction between the plastic sheathing and the reinforcement.

2. A garden bench board according to claim 1, wherein the reinforcement is a tube and the deformable means are provided for preventing a tearing apart of the sheathing due to shrinkage.

3. A garden bench board according to claim 2, wherein the tube is a rectangular tube.

4. A garden bench board according to claim 3, wherein each of the deformable means is a block of material which does not melt at a melting temperature of the plastic sheathing.

5. A garden bench board according to claim 4, wherein the block of material is inserted into ends of the reinforcing tube and is embedded in the plastic sheathing.

6. A garden bench board according to claim 5, wherein the block of material is wood.

* * * * *